(12) United States Patent
Perot et al.

(10) Patent No.: US 8,362,739 B2
(45) Date of Patent: Jan. 29, 2013

(54) CONTROL APPARATUS FOR PHOTOVOLTAIC MODULES

(75) Inventors: Mauro Perot, Santa Giustina (IT); Fabio D'Incà, Sedico (IT)

(73) Assignee: Carlo Gavazzi Services AG, Steinhausen (CH)

( * ) Notice: Subject to any disclaimer, the term of this patent is extended or adjusted under 35 U.S.C. 154(b) by 512 days.

(21) Appl. No.: 12/592,620

(22) Filed: Nov. 30, 2009

(65) Prior Publication Data

US 2011/0125338 A1    May 26, 2011

(30) Foreign Application Priority Data

Nov. 26, 2009 (DE) ...................... 20 2009 016 164 U

(51) Int. Cl.
    *H02J 7/00* (2006.01)
    *H01L 31/042* (2006.01)
(52) U.S. Cl. ........ 320/101; 320/107; 320/114; 136/244; 136/252
(58) Field of Classification Search ................ 320/101
See application file for complete search history.

(56) References Cited

U.S. PATENT DOCUMENTS

| 6,856,047 | B2* | 2/2005 | Murabayashi et al. | 307/150 |
|---|---|---|---|---|
| 7,256,566 | B2* | 8/2007 | Bhavaraju et al. | 320/101 |
| 7,786,703 | B2* | 8/2010 | Nakao | 320/149 |
| 2006/0162772 | A1 | 7/2006 | Presher, Jr. et al. | |
| 2007/0252716 | A1 | 11/2007 | Burger | |
| 2007/0278989 | A1* | 12/2007 | Leboff | 320/101 |
| 2009/0140715 | A1* | 6/2009 | Adest et al. | 323/318 |
| 2009/0283129 | A1* | 11/2009 | Foss | 136/244 |
| 2010/0283325 | A1* | 11/2010 | Marcianesi et al. | 307/82 |
| 2011/0031813 | A1* | 2/2011 | Falk | 307/77 |

FOREIGN PATENT DOCUMENTS

| DE | 40 32 569 | 4/1992 |
|---|---|---|
| DE | 10 2006 025 604 | 11/2007 |
| EP | 2 086 101 | 8/2009 |

* cited by examiner

*Primary Examiner* — Edward Tso
*Assistant Examiner* — Ahmed Omar
(74) *Attorney, Agent, or Firm* — Collard & Roe, P.C.

(57) ABSTRACT

Control apparatus 1 for photovoltaic modules 3 which can be connected to one or more photovoltaic modules 3. The control apparatus is able to check for the proper working of the solar modules, and also to collect all electrical data like voltage, current, power, energy in order to calculate also the efficiency of the plant. Up to 16 modules can be used (including a master controller, temperature measurement modules, output modules, input modules) and they are interconnected by using a bus system which does not require any wire. A base level consist of one master controller module and one or more input modules. An extended system includes also additional modules, like measurement of temperatures or relay outputs.

19 Claims, 3 Drawing Sheets

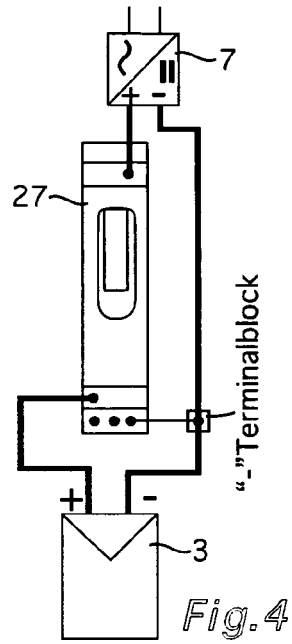
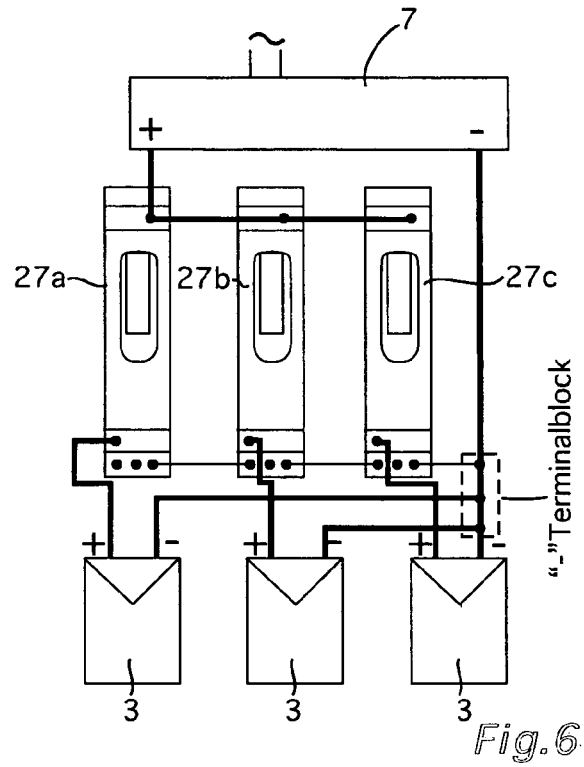
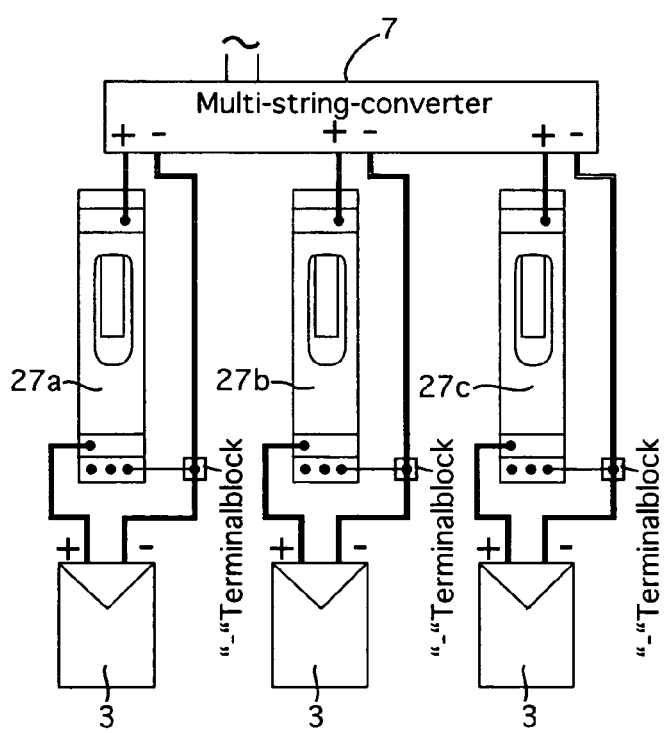

CONTROL APPARATUS FOR PHOTOVOLTAIC MODULES

CROSS REFERENCE TO RELATED APPLICATIONS

Applicants claim priority under 35 U.S.C. §119 of German Application No. 20 2009 016 164.1 filed on Nov. 26, 2009.

The invention refers to a control apparatus for photovoltaic modules, wherein the control apparatus comprises at least one input connection system.

A control apparatus for photovoltaic modules is known from US 2007/0252716 A1. According to the prior art an inverter is provided which can be connected to at least one photovoltaic generator at the input end and to a power system at the output end. The inverter includes a microcontroller for diagnosing the inverter. The inverter transforms the direct current coming from the photovoltaic modules into alternating current. The microcontroller is connected to the alternating current side (ac-side) of the inverter module.

It is an object of the invention to provide a control apparatus which is able to monitor and control several functions of one ore more photovoltaic modules.

According to the invention this object is achieved by the control apparatus as claimed in claim 1. The control apparatus is characterized in that said input connection system is adapted to be connected to at least one photovoltaic module and the control apparatus comprises at least one controller unit which is connected between said at least one input connection system and a main breaker. By arranging the control apparatus in that manner it is able to monitor and control several functions of one ore more photovoltaic modules.

Preferably, the controller unit is adapted to collect data, by means of pulses or a serial communication port by external energy meters.

According to a further aspect of the invention, the controller unit is adapted to control the photovoltaic modules and calculate the relevant efficiency.

According to a still further aspect of the invention the controller unit is adapted to verify permanently the proper operating of the photovoltaic modules and is further adapted to alert of theft, fuse blown, incorrect polarity and connection.

According to a still further aspect of the invention the controller unit is provided with input and/or output units which allow to control external devices.

According to a still further embodiment the control apparatus comprises at least one input unit which preferably integrates a fuse.

According to a still further aspect of the invention the control apparatus comprises at least one measurement unit which preferably is adapted to measure temperature, voltage, current, power and/or energy.

According to a still further aspect of the invention at least two of said controller unit, input unit, measurement unit are interconnectable by a bus system, wherein preferably at least two of said units have at least one male connector at a first side and at least one corresponding female connector at a second side which is opposite to said first side, so that said units are connectable with each other, without requiring a wire between them.

A further advantageous embodiment of the invention provides that at least one of said units comprises a groove which fits on a standard mounting rail.

A further advantageous embodiment of the invention provides that at least one of said units includes an allocator device which is capable of automatically assigning an address or a subaddress to said units according its position.

Preferably, the control apparatus is suitable as retro-fit allowing the units to replace existing fuse holders in electrical panels.

According to a still further aspect of the invention the control apparatus is modular which allows to adapt it to individual needs for different photovoltaic plants.

According to a further aspect of the invention the control apparatus includes multicolour LEDs adapted to give immediate visual indication of the electrical parameters status and level of the photovoltaic modules.

The control apparatus according to the invention may be used in connection with photovoltaic modules which are connected in series and/or photovoltaic modules which are connected in parallel.

The invention will be explained in more detail by way of example with reference to the figures in which FIG. 1 is a schematic block diagram of a photovoltaic plant which is provided with a control apparatus according to the invention;

FIG. 4 shows a schematic diagram of a single string configuration;

FIG. 5 shows a schematic diagram of a multi-string configuration;

FIG. 6 shows a schematic diagram of a parallel string configuration.

Figure 1:
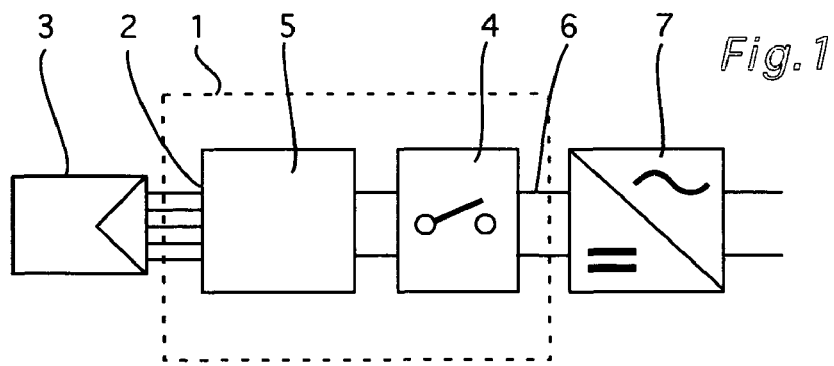

The photovoltaic plant as shown as an overview in FIG. 1 comprises a photovoltaic module 3 which may be a single string or a multi-string photovoltaic generator. The photovoltaic module 3 is connected to a control apparatus 1 via an input connection system 2 by five strings in the present example. At the output side of the control apparatus 1 an inverter 7 is provided which converts the dc-current generated by the photovoltaic module 3 into an ac-current which can be supplied into the public grid. The control apparatus 1 comprises the input connection system 2, a controller unit 5 and a main breaker 4.

Figure 2:
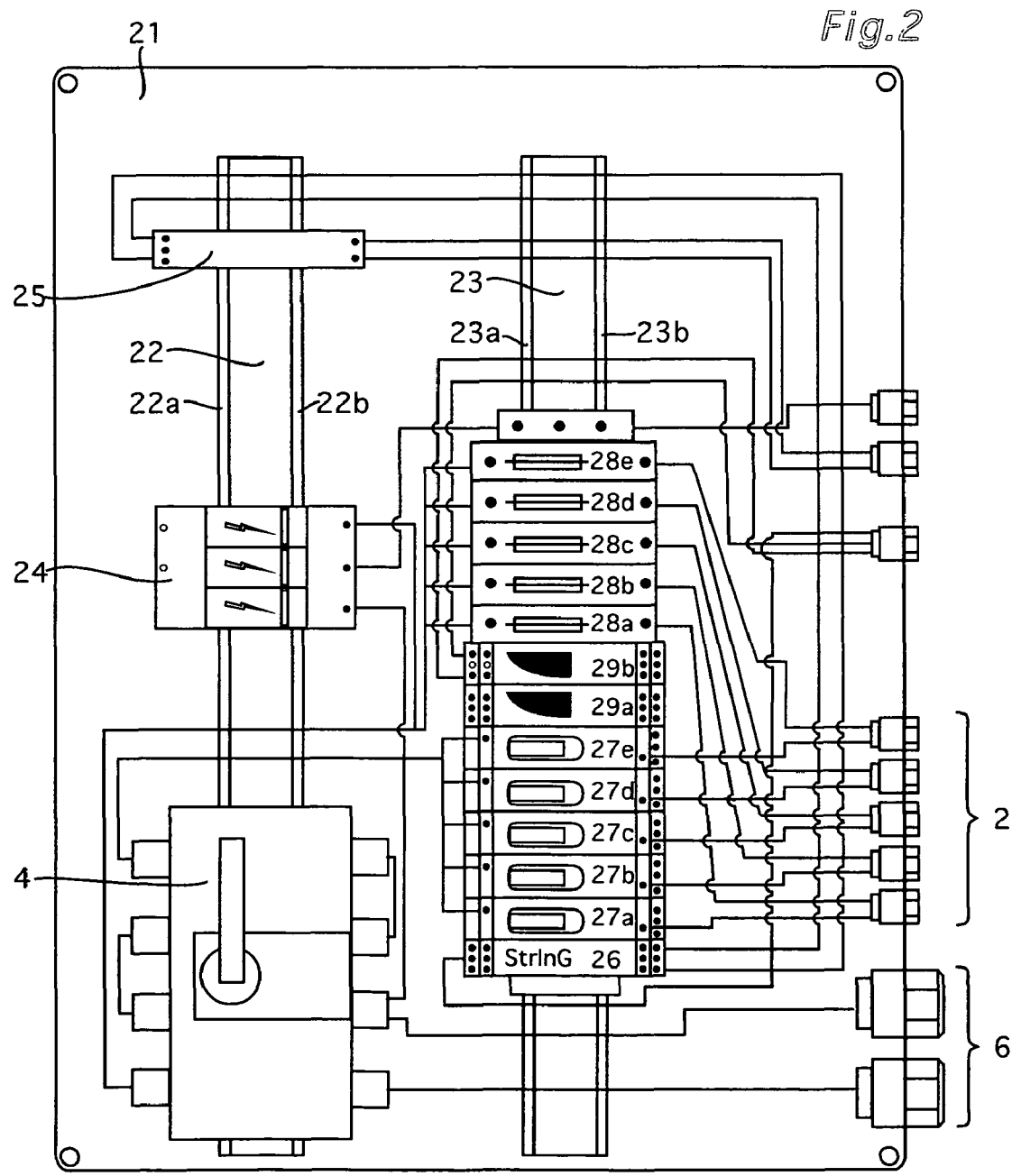
FIG. 2 shows the control apparatus according to the invention.

The control apparatus 1 is shown in detail in FIG. 2. Attached to a bottom plate 21 there are two rails 22 and 23 having grooves 22a, 22b and 23a, 23b, respectively. The rail 22 carries the main breaker 4, a surge protector module 24 and a power supply 25 suitable for rail mounting. According to a base level system embodiment the rail 23 carries a row of modules, including a display module 26 and five input modules 27a, 27b, 27c, 27d and 27e in this example.

These modules perform the local bus management for both, measuring units as well as the I/O units. Further the modules 27a, 27b, 27c, 27d and 27e assign the proper local unit address automatically and gathers all the local measurements coming from measuring units.

An extended system embodiment includes additional modules, like measurement of temperatures or relay outputs. The modules can provide two relay outputs to manage alarms and/or external loads (such as a lighting system, a photovoltaic washing system, etc.) and two photovoltaic panel temperature inputs. A DC-power-measuring unit (power generated by photovoltaic panel) may be provided, which features a built-in fuse holder. Other modules collect relevant environmental data (through external sensors) such as wind speed, air temperature and sun irradiation. So the control apparatus is able to check for the proper working of the solar arrays, and also to collect all electrical data like voltage, current, power, energy in order to calculate also the efficiency of the plant. Up to 16 modules can be used (including a master controller, temperature measurement modules, output modules, input modules) and they are interconnected by using a bus system which does not require any wire, which will be explained later in detail. The number and type of modules is chosen by the user according to his needs. The modules integrate a fuse. They can easily be mounted in existing panels, substituting the fuse holders that are present normally (retro-fit mounting).

A connection system 2 which comprises five socket connectors, each of which has two poles, is connected with one kind of polarity to the input modules 27a, 27b, 27c, 27d, 27e, while the five other poles of the second polarity are connected to five fuses 28a, 28b, 28c, 28d, 28e. Having passed the fuses the current reaches the main breaker 4 which is connected to the output system 6 which comprises two socket connectors for connecting to the inverter 7.

Figure 3:
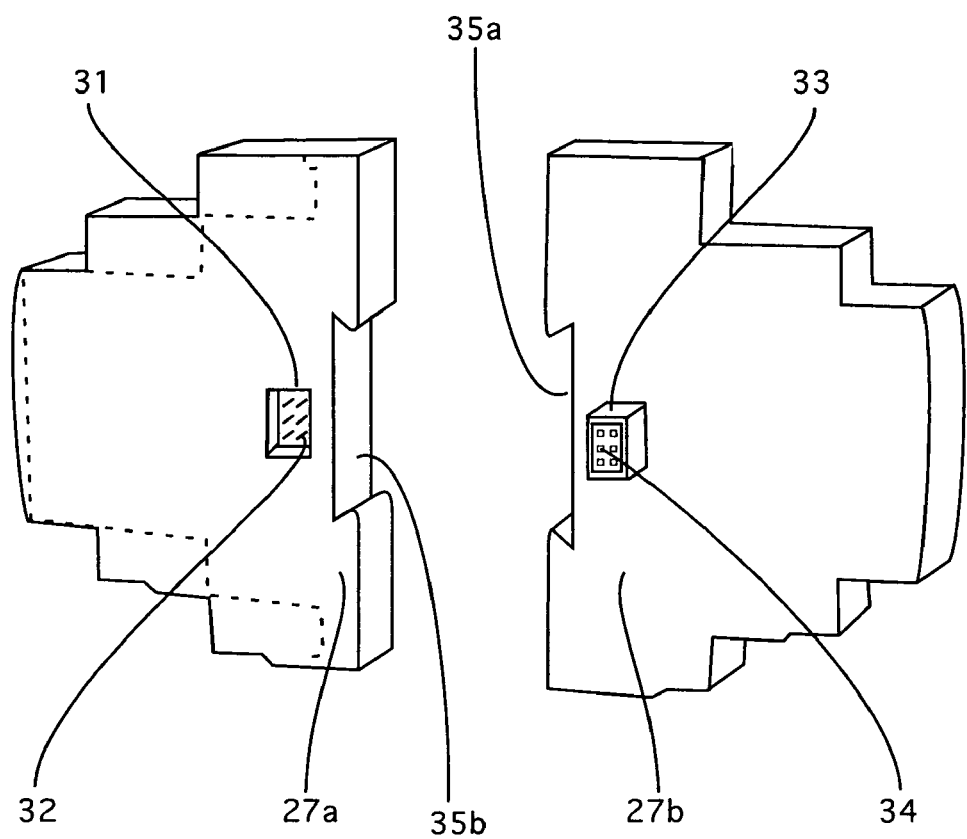
FIG. 3 shows in perspective view two modules which can be used in the control apparatus according to the invention.

FIG. 3 shows in perspective view two modules—such as modules 27a and 27b of FIG. 2—which can be used in the control apparatus according to the invention. The module 27a shown in FIG. 3 has a square recess 31 which is provided with six conducting pins 32 (as an example only). The module 27b has at its side shown in the FIG. 3 a square protrusion 33 which is sized such that it fits into the recess 31 of module 27a. The protrusion 33 of module 27b is provided with pinholes 34 which correspond to the arrangement of the conducting pins 32. At the (non-visible) side of module 27a, which side is opposite to the visible side in the drawing, there is provided a protrusion which is in line with the recess 31 and has the same shape and the same location as the protrusion 33 of module 27b. Similarly, at the (non-visible) side of module 27b which side is opposite to the visible side in the drawing there is provided a recess which has the same shape and the same location as the recess 31 of module 27a.

Both modules 27a and 27b have an undercut groove 35a and 35b which allows to firmly attach the modules to the mounting rail 23 (FIG. 2). When the modules 27a and 27b are mounted on the rail 23 (FIG. 2) close to each other, the protrusion 33 of module 27b is inserted into the recess 32 of module 27a and the pins 32 are inserted into the pinholes 34 and provide for electrical connection between the two modules 27a and 27b without requiring a wire. Modules of this kind can be piled up and electrically connected as long as there is sufficient space on the rail 23.

FIG. 4 shows a schematic diagram of a single string configuration. The negative pole (−) of the solar module 3 is connected directly to the negative input of the inverter 7. The input module 27 is grounded via a negative terminal block. The positive pole (+) is connected to the input module 27 of the controller unit. The current which comes from the solar module 3 is channeled through the input modul 27 for purposes of measuring parameters such as voltage, current, power and energy and reaches finally the positive input of the inverter 7.

FIG. 5 shows a multi-string configuration. There are three photovoltaic modules 3. Each of the three negative poles of the photovoltaic modules is separately connected to a multi-string inverter 7. The input modules 27a, 27b and 27c are grounded via negative terminal blocks. The positive connections of the three photovoltaic modules 3 are channeled through the input modules 27a, 27b and 27c for measurement and control purposes, similar as in the single string configuration of FIG. 4.

FIG. 6 shows a parallel string configuration. There are three photovoltaic modules 3 whose negative poles are connected to each other at a terminal block which is connected to the single negative input of the inverter 7. The positive connections of the three photovoltaic modules 3 are channeled through the input modules 27a, 27b and 27c for measurement and control purposes, similar as in the configuration of FIG. 5. The positive outputs of the input modules 27a, 27b and 27c are connected to each other and then connected to a single positive input of the converter 7.

The following advantages are achieved by the system according to the invention:

1) The system is modular, one master module can be connected to other—for example—up to 15 modules, chosen by the user.

2) Easy connection, the modules are installed on standard DIN-rails and they can be used for either retrofit or front-panel use.

3) The interconnection between the modules is very easy, as they use a bus system for interconnection.

4) Dynamic allocation of the communication address. This means that the address is automatically assigned to each module, according to its position.

5) Sub-addressing system. For each module, a sub-address is handled, in such a way that we can have 15 (max number of modules in one system)×247 (max number of addresses in Modbus)=3705 total addresses.

6) Measurement related to strings and inverters of voltage, current, frequency, power, energy instead of the only measurement of current.

7) The master controller can collect pulse data by external energy meters. Together with other measurements carried out by the system, and the data of temperatures (of panel of environment) available by the input modules, these data are used to automatically calculate the efficiency of the plant.

8) Integrated verification of the string. The system verifies the proper operating of the string and its presence during the day and during the night. So that the system operates also as anti-theft.

9) Possibility of hourly activation of digital outputs, to control external devices, e.g. light or automatic cleaning.

10) The system can be used as a single unit, by using a master controller and a measurement module, in order to monitor one string, as well as a multiple unit to monitor up to 15 strings. Moreover the system can be extended as a distributed data-logger main system, by using a simple RS485 network. If one of the system fails, it does not affect the measurements and the data base of the others (memory capability is split in every single VMU-M unit).

11) The input modules VMU-S integrate the fuse, for use with currents up to 16 A. This makes the installation easier. They are available also without internal fuses, for use with higher currents.

12) The input modules are insulated each other for independent string measurements, but the terminals have been designed for easy parallel connection if necessary. This allows using them for multi-string PV generators (using inverters with several insulated inputs) as well as measurement of strings in parallel, or single strings.

The advantages achieved by the invention are summarized as follows:

The control apparatus is able to check for the proper working of the solar arrays, and also to collect all electrical data like voltage, current, power, energy in order to calculate also the efficiency of the plant. Up to 16 modules can be used (including a master controller, temperature measurement modules, output modules, input modules) and they are interconnected by using a bus system which does not require any wire. The number and type of modules is chosen by the user according to his needs. The module are 1 MOD DIN compatible and integrate the 10×38 mm fuse. They can easily be mounted in existing panels, substituting the fuse holders that normally are present. A "base" active level consist of one master controller module and one or more input modules. An extended system includes also additional modules, like measurement of temperatures or relay outputs.

The invention claimed is:

1. Control apparatus for photovoltaic modules, wherein the control apparatus comprises at least one input connection system wherein said input connection system is adapted to be connected to at least one photovoltaic module and the control apparatus comprises at least one controller unit which is connected to said at least one input connection system and wherein the controller unit is adapted to verify permanently the proper operating of the photovoltaic modules and is further adapted to alert of theft, fuse blown, incorrect polarity and connection.

2. Control apparatus according to claim 1, wherein the control apparatus comprises a main breaker.

3. Control apparatus according to claim 1, wherein the controller unit is adapted to collect data, by means of pulses or a serial communication port by external energy meters.

4. Control apparatus according to claim 1, wherein the controller unit is adapted to control the photovoltaic modules and calculate the relevant efficiency.

5. Control apparatus according to claim 1, wherein the controller unit is adapted to control external devices by means of input and/or output units.

6. Control apparatus according to claim 1, wherein it comprises at least one input unit.

7. Control apparatus according to claim 6, wherein the at least one input unit integrates a fuse.

8. Control apparatus according to claim 1, wherein it comprises at least one output unit.

9. Control apparatus according to claim 1, wherein it comprises at least one measurement unit.

10. Control apparatus according to claim 9, wherein the measurement unit is adapted to measure temperature, voltage, current, power and/or energy.

11. Control apparatus according to claim 1, wherein at least two of said units are interconnectable by a bus system.

12. Control apparatus according to claim 11, wherein at least two of said units have at least one male connector at a first side and at least one corresponding female connector at a second side which is opposite to said first side, so that said units are connectable with each other.

13. Control apparatus according to claim 1, wherein at least one of said units comprises a groove which fits on a standard mounting rail.

14. Control apparatus according to claim 1, wherein said at least one of said units includes an allocator device which is capable of automatically assigning an address or a subaddress to said units according its position.

15. Control apparatus according to claim 1, wherein it is suitable as retro-fit allowing the units to replace existing fuse holders in electrical panels.

16. Control apparatus according to claim 1, wherein the system is modular.

17. Control apparatus according to claim 1, wherein it includes multicolor LEDs adapted to give immediate visual indication of the electrical parameters status and level of the photovoltaic modules.

18. Control apparatus according to claim 1, wherein at least two of the photovoltaic modules are connected in series.

19. Control apparatus according to claim 1, wherein at least two of the photovoltaic modules are connected in parallel.

* * * * *